United States Patent
Diab et al.

(10) Patent No.: US 9,110,668 B2
(45) Date of Patent: Aug. 18, 2015

(54) ENHANCED BUFFER-BATCH MANAGEMENT FOR ENERGY EFFICIENT NETWORKING BASED ON A POWER MODE OF A NETWORK INTERFACE

(75) Inventors: Wael William Diab, San Francisco, CA (US); Steven B. Lindsay, Bend, OR (US)

(73) Assignee: BROADCOM CORPORATION, Irvine, CA (US)

( * ) Notice: Subject to any disclaimer, the term of this patent is extended or adjusted under 35 U.S.C. 154(b) by 220 days.

(21) Appl. No.: 13/362,966

(22) Filed: Jan. 31, 2012

(65) Prior Publication Data

US 2013/0198538 A1 Aug. 1, 2013

(51) Int. Cl.
*G06F 1/32* (2006.01)
*H04L 12/12* (2006.01)

(52) U.S. Cl.
CPC ............... *G06F 1/3278* (2013.01); *H04L 12/12* (2013.01); *Y02B 60/126* (2013.01); *Y02B 60/32* (2013.01); *Y02B 60/34* (2013.01); *Y02B 60/35* (2013.01)

(58) Field of Classification Search
CPC ......... G06F 1/26; G06F 1/3278; Y02B 60/32; Y02B 60/34; Y02B 60/35; Y02B 60/126; H04L 12/12
USPC .................................................. 713/310, 320
See application file for complete search history.

(56) References Cited

U.S. PATENT DOCUMENTS

| | | | |
|---|---|---|---|
| 2002/0019954 A1* | 2/2002 | Tran .............................. | 713/600 |
| 2004/0264396 A1* | 12/2004 | Ginzburg et al. ............. | 370/311 |
| 2006/0107081 A1* | 5/2006 | Krantz et al. ................. | 713/300 |
| 2006/0140218 A1* | 6/2006 | Winterton ..................... | 370/476 |
| 2007/0218938 A1* | 9/2007 | Carter .......................... | 455/528 |
| 2007/0226407 A1* | 9/2007 | Radulescu et al. ........... | 711/110 |
| 2007/0286222 A1* | 12/2007 | Balasubramanian ......... | 370/412 |
| 2009/0077401 A1* | 3/2009 | Tsai, Jr. ........................ | 713/320 |
| 2010/0115306 A1* | 5/2010 | Diab ............................ | 713/320 |
| 2011/0029659 A1* | 2/2011 | Shah ............................ | 709/224 |
| 2011/0080919 A1* | 4/2011 | Ding et al. ................... | 370/419 |
| 2012/0263084 A1* | 10/2012 | Liu et al. ...................... | 370/311 |
| 2013/0067260 A1* | 3/2013 | Gatta et al. ................... | 713/323 |
| 2013/0179612 A1* | 7/2013 | Feekes ......................... | 710/106 |

* cited by examiner

*Primary Examiner* — Thomas Lee
*Assistant Examiner* — Danny Chan
(74) *Attorney, Agent, or Firm* — Oblon, McClelland, Maier & Neustadt, L.L.P.

(57) ABSTRACT

Various methods and systems are provided for buffer-batch management for energy efficient networking. In one embodiment, among others, a system includes a host device including an interface with a network. A device driver monitors requests to transmit packets from the host device to the network, buffers the packets in memory of the host device when the host device network interface is estimated to be in a low power mode, and initiates transition of the host device network interface to a full power mode based at least in part upon predefined criteria associated with the buffered packets. The host device network interface may begin transmission of the buffered packets when the host device network interface enters the full power mode. The host device network interface may be a network interface controller such as, e.g., an Ethernet controller configured for Energy Efficient Ethernet operation.

28 Claims, 6 Drawing Sheets

ENHANCED BUFFER-BATCH MANAGEMENT FOR ENERGY EFFICIENT NETWORKING BASED ON A POWER MODE OF A NETWORK INTERFACE

BACKGROUND

Ethernet networks are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks. As the number of devices connected to data networks increases and higher data rates are required, there is a growing need for new transmission technologies which enable higher data rates. Conventionally, however, increased data rates often result in significant increases in power consumption. Accordingly, there is a push to reduce power consumption when communicating over Ethernet networks. Energy Efficient Ethernet (EEE) is an emerging feature for Ethernet devices that is being defined by the IEEE Std 802.3az™-2010 task force. The basic goal of EEE is for Ethernet network links to dynamically enter a lower power state to reduce power consumption when the Ethernet link is idle, and then to be able to transition back to a higher power state running at full speed when there is network activity.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
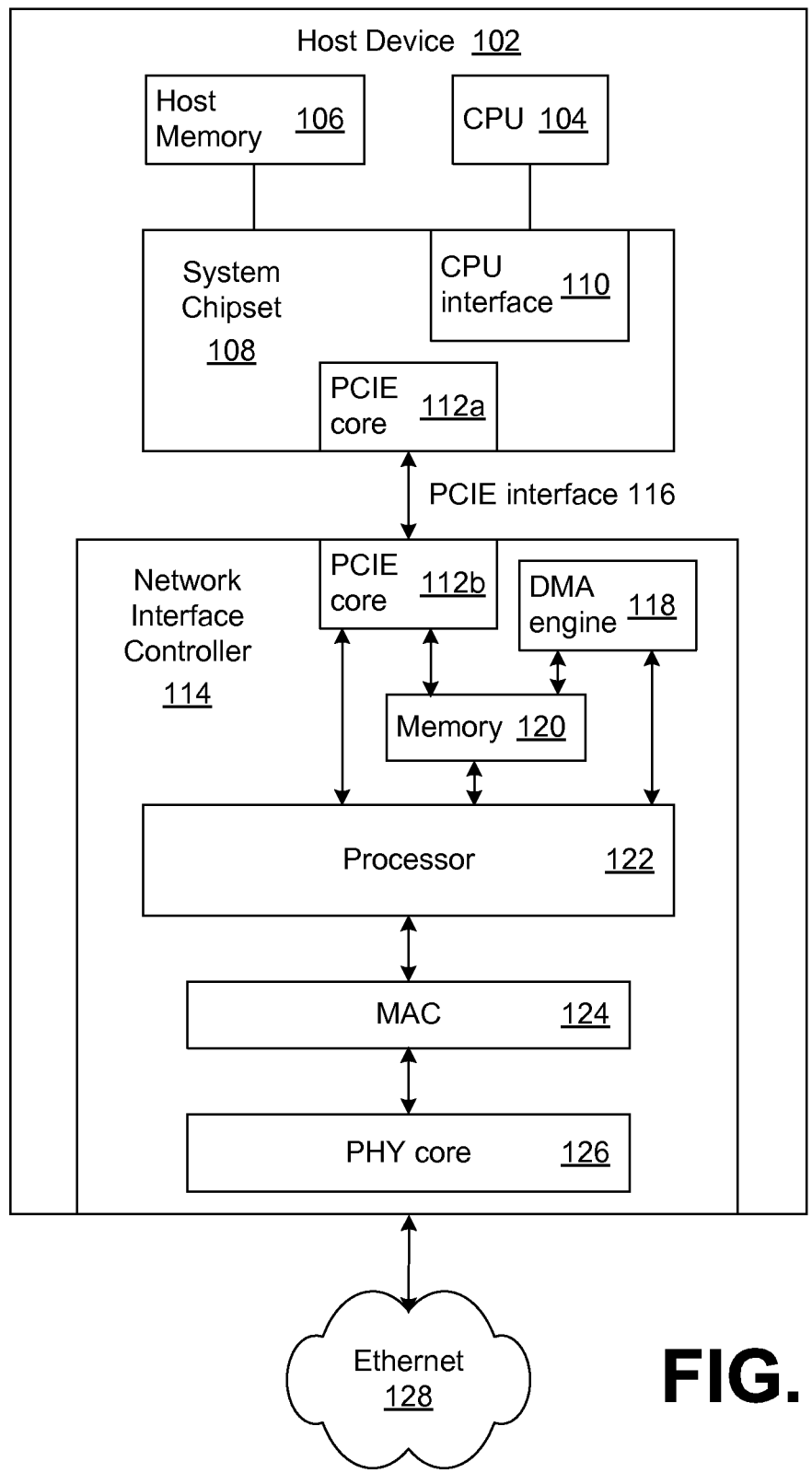
FIG. 1 is a graphical representation of an example of a network host device including a network interface controller (NIC) in accordance with various embodiments of the present disclosure.

Disclosed herein are various embodiments of methods and systems related to buffer-batch management for energy efficient networking. Reference will now be made in detail to the description of the embodiments as illustrated in the drawings, wherein like reference numbers indicate like parts throughout the several views.

The IEEE Std 802.3az™-2010 Energy Efficient Ethernet (EEE) standard provides for the ability of a network device to enter and exit lower power sleep states on an Ethernet link in order to save power. The network device may be, e.g., a server, controller, client, a switch, etc. that includes stack layers in an open systems interconnection (OSI) model beginning with the physical layer (PHY) at the bottom of the stack. The physical layer is configured to interface with a network through physical layer media (e.g., fiber, shared fiber, twisted pair, twinax, backplane copper, etc.) as well as provide other functionality such, e.g., a physical coding sublayer, a physical medium attachment sublayer, and/or a physical medium dependent sublayer. The physical layer may be configured to support speeds up to, e.g., 10G, 40G, 1000, 400G, or higher.

The decision of when a network device enters a low power EEE sleep state is part of the control policy of the network device. Ideally, a form of "buffering and batching" of packet transmission would allow power to be saved on multiple layers and/or interfaces in the network device (e.g., Ethernet interface, PCIE interface, processor/memory bus, etc.), thus improving power use by saving power at multiple levels. For example, where EEE is part of a network interface controller (NIC) such as, e.g., an Ethernet controller that is being integrated into a network host device (e.g., a server, client platform, switch, etc.), the NIC may maximize its power savings if its peripheral component interconnect express (PCIE) interface and Ethernet interface were idle at the same time. In addition, other components and/or interfaces in the host device may be coordinated with EEE for greater power savings via other techniques that are independent of EEE (e.g., PCIE ASPM, processor Cx states, etc.). When configured to implement EEE, the physical layer may operate in a low power idle (LPI) condition to reduce energy consumption during periods of low link utilization (or high idle time).

Referring to FIG. 1, shown is a graphical representation of an example of a network host device 102 such as, e.g., a server, a client platform, or other computing device in communication with a network through an interface. The host device 102 may include a central processing unit (CPU) 104, a host memory 106, a system chipset 108 and an interface with the network such as, e.g., NIC 114. Stored in the host memory 106 may be both data and several components that are executable by the CPU 104. In particular, stored in the host memory 106 and executable by the CPU 104 may be an operating system, a device driver, and potentially other applications. The system chipset 108 may communicatively couple the CPU 104, host memory 106, and the host device interface with the network. For example, the system chipset 108 may include a CPU interface 110 and a PCIE core 112a as illustrated in FIG. 1. The PCIE core 112a may be coupled to another PCIE core 112b in the NIC 114 via a PCIE interface 116 (e.g., a PCIE bus). The system chipset 108 may be coupled to PCIE buses and/or devices, one or more processors, CPU 104, and memory such as, e.g., host memory 106. In some embodiments, some or all of the system chipset 108 may be integrated into the CPU 104. The system chipset 108 may also be configured to transfer data to/from a LAN interface controller, external memory, and/or other storage device. In some embodiments, the host memory 106 may also be directly coupled to the NIC 114.

In the example of FIG. 1, the host device network interface is a NIC 114 coupled to the system chipset 108 via the PCIE cores 112a/112b and PCIE interface 116. In some embodiments, the NIC 114 may be coupled through an I/O controller hub (ICH). The NIC 114 may include the PCIE core 112b, a direct memory access (DMA) engine 118, a memory 120, a processor 122, a medium access control (MAC) 124, and a physical layer (PHY) core 126. In addition, the host device 102 may be communicatively coupled with a network interface (e.g., Ethernet interface 128) through the NIC 114. While the embodiment of FIG. 1 includes a CPU 104 and an Ethernet interface 128, other implementations may employ another type of processor and/or another type of data link layer or physical media, respectively. In some embodiments, the CPU 104 may be enabled to handle a plurality of networking protocols and may be directly coupled to the Ethernet interface 128. Different degrees of integration and/or separation between the components may also be implemented.

The PHY core 126 may be configured to receive and/or transmit packets via a network interface such as, e.g., Ethernet interface 128. The MAC 124 may be configured to interface with the PHY core 126 and control access to a medium that may be shared between multiple entities. The MAC 124 may also furnish transmission protocol knowledge and/or management and may handle errors in the physical layer, flow control and frame synchronization. For example, the MAC 124 may be configured to support an Ethernet 802.3 protocol, support packet classification and error detection logic for incoming packets, encode and/or decode data packets into bits, and support access to the memory 120 for temporary packet buffering. The MAC 124 may also be configured to handle offloading of tasks such as checksum calculations, accelerating TCP/IP or IPSEC traffic, for example. In addition, the MAC 124 may be configured to centrally manage power management policies for the NIC 114.

The processor 122 may be configured to determine the connection identifier and/or a packet type for each packet. The memory 120 may be coupled to the DMA engine 118 and may be configured to employ a buffering scheme to store network inbound packets until they are placed in the host memory 106 by the DMA engine 118. The memory 120 may also be configured to temporarily store data associated with outbound packets after that data has been transferred from the host device 102 to the NIC 114 via the DMA engine 118, and before the NIC 114 is able to transmit that data via the Ethernet interface 128. The DMA engine 118 may be configured to coordinate DMA read and/or write requests with the PCIE core 112b. The PCIE core 112b may be configured to generate DMA requests which may be communicated to the system chipset 108 over the PCIE interface 116, support PCIE protocol, and provide PCIE target support.

The CPU interface 110, PCIE core 112, DMA engine 118, MAC 124, and/or PHY core 126 may be embodied in dedicated hardware, a general purpose processor configured to execute software or code, or a combination of dedicated hardware and software/general purpose hardware. If embodied in dedicated hardware, each can be implemented as a circuit or state machine that employs any one of or a combination of a number of technologies. These technologies may include, but are not limited to, discrete logic, a programmable logic device, an application specific integrated circuit (ASIC), a field programmable gate array (FPGA), a system on chip (SoC), a system in package (SiP), or other hardware device having logic gates for implementing various logic functions upon an application of one or more data signals.

The memory (e.g., host memory 106 and NIC memory 120) is defined herein as including both volatile and nonvolatile memory and data storage components. Volatile components are those that do not retain data values upon loss of power. Nonvolatile components are those that retain data upon a loss of power. Thus, the memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

To transmit a packet through the network interface, the CPU 104 may initiate a PCIE write transaction to the NIC 114 through PCIE core 112a. The NIC 114 may then initiate a DMA read through the PCIE core 112b. The data received from the host device 102 may be assembled by the NIC 114 in the MAC 124, which may then transmit the data to the PHY core 126. The PHY core 126 may then transmit packets with the data via the network interface, e.g., Ethernet interface 128.

When a packet is received by the NIC 114 from the network interface, the data in the packet enters the NIC 114 through the PHY core 126 and is processed by the MAC 124. Processing by the MAC 124 may include, e.g., performing a cyclic redundancy check (CRC) on the packet to check for errors. The DMA engine 118 may then initiate one or more DMA requests to PCIE core 112b to transfer the packet to host memory 106 via the PCIE interface 116. After transfer to the host memory 106, the packet is available for further access and/or processing by the host device 102.

Power savings may be achieved when the interface of the network host device 102 (e.g., NIC 114 of FIG. 1) is configured to support EEE. For example, when the NIC 114 has been idle for a defined period of time, the PHY core 126 may transition to a lower power state, for example, a low power idle (LPI) mode, as specified by the IEEE Std 802.3az™-2010 specification. LPI provides for a lower-consumption energy state that can be employed during periods of low-link utilization (high idle time), which is common in many Ethernet networks. LPI allows for rapid transitions back to a full power (or active) state for high-performance data transmission. The transition of the PHY core 126 to the low power state may be transparent to the operating system on the host device 102. The time period of transitioning from the low power state back to a full power state may be referred to as the wake time, Tw, of the PHY core 126.

Other components of the host device network interface (e.g., NIC 114) and the host device 102 may also include power saving features that are independent of EEE (e.g., PCIE Active State Power Management (ASPM), processor Cx states, etc.). The PCIE core 112 can include an ASPM feature that may include two or more power states, for example, a low power PCIE state (L1) and a full power PCIE state (L0). When data is being communicated to or from the NIC 114 over the PCIE interface 116, PCIE core 112b operates in the full power PCIE state L0. When the PCIE activity stops and the PCIE core 112b has been inactive for a defined period of time, e.g., in the range of about 10-5000 microseconds, then the ASPM feature may transition the PCIE core 112b to the low power PCIE state L1. For example, if the PCIE core 112b has been inactive for 30 to 50 microseconds, then the PCIE core 112b begins to enter the low power PCIE state L1. When operating in the low power PCIE state L1, the PCIE core 112b consumes less power than when operating in the full power PCIE state L0. However, the low power PCIE state L1 can also impact the performance and responsiveness of the PCIE core 112b. When PCIE operations need to be restored (e.g., to start a transfer of data across the PCIE interface 116) the ASPM feature returns the PCIE core 112b to the full power PCIE state L0 over a transition period that is referred to as the L1 to L0 exit latency. For instance, the transition of the PCIE core 112b to the full power PCIE state L0 over the L1 to L0 exit latency may be initiated by a request to perform a PCIE transaction such as, e.g., a DMA transfer.

In order to save more power, power savings may be coordinated between multiple levels of the host device network interface (e.g., PCIE interface, PHY core, processor/memory bus, etc.) by using a form of "buffering and batching" of packet transmission. For example, a NIC 114 would increase its power savings if its PCIE core 112b and PHY core 126 were idle at the same time so that both the PCIE core 112b and the PHY core 126 could enter power saving states at the same time. This could be extended to other levels and/or components of the interface of the host device 102 (e.g., NIC 114) as well. The more aggressive the "buffering and batching" of packet transmission, the greater the power savings may be, but with a larger negative impact on performance and responsiveness (latency). However, typically the memory 120 of the NIC 114 offers limited on-board buffering capabilities. Because of this, NICs 114 (including EEE enabled NICs) are generally not able to "hold off" the transmission of packets for extended periods of time that are much longer than the wake time, Tw, specified by EEE.

Even if the NIC 114 did include an extensive on-board buffer for transmit packets, when the host device 102 informs the NIC 114 that more data was available to send (so that NIC 114 could transfer that data from host memory 106 via DMA engine 118 and temporarily buffer the data in memory 120 on board the NIC 114), the notification causes the PCIE core 112b to operate in the full power PCIE state L0 (instead of the low power PCIE state L1) of ASPM. Therefore, a traditional MAC hold off using extensive buffering of outbound packets inside the memory 120 of the NIC 114 to achieve a "buffer and batch" of transmitted packets limits the ability of the NIC 114 to save power in the PCIE core 112b (as well as power consumed by the PCIE core 112a of the host device 102) beyond any natural idle gaps in the traffic profile. This is because the NIC 114 does not coordinate and synchronize the power savings at the PHY layer (due to EEE) with potential power savings at the PCIE core 112 (through ASPM) as well as at the system chipset level of the host device 102. By controlling the transmission of packet using a form of "buffering and batching," the number of transitions between a low power state and a full power state can be reduced resulting in increased power savings.

Control of the "buffering and batching" of the transmitted packets may be implemented with a device driver executed by the host device 102. The device driver may be stored in the host memory 106 and executable by the CPU 104. The device driver may be configured to monitor requests to transmit packets from the host device 102 to a network through the host device network interface such as, e.g., NIC 114. While the following description is based upon the NIC 114 of FIG. 1, it is equally applicable to other host device network interfaces as can be understood. When the device driver receives a request from a higher layer protocol (e.g., TCP/IP) to send a packet, the device driver evaluates whether to immediately forward the send packet command to the NIC 114 or whether to "buffer" and then "batch" the transmit request. The determination by the device driver can be based upon multiple criteria, which can include, e.g., some level of user configurability. For instance, there may be an option to disable this buffering feature if the user was more concerned about transmission latency than power savings. Other criteria may be associated with the packet (or transmit request) and/or the estimated operating condition of the NIC 114. If the device driver delays the transmit request, the packet is buffered in the host memory 106 for later "batch" transfer to the NIC 114 with other buffered packets. The "batch" transfer of any buffered packets for transmission through the NIC 114 to the network through, e.g., Ethernet interface 128 may be coordinated with PCIE core 112b power savings (e.g., through ASPM and the optimized buffer flush/fill (OBFF) capability) and PHY core 126 power savings (e.g., through EEE). Allowing the PCIE core 112b to go into a lower power state can provide a domino effect of power savings for upstream PCIE components (e.g., CPU interface 110 and PCIE core 112b). In addition, power saving functions of other layers and components of the NIC 114 may be coordinated to provide added energy savings.

Referring to FIGS. 2-6, shown are flowcharts illustrating examples of functionality implemented by a device driver in accordance with various embodiments of the present disclosure. It is understood that the flowcharts of FIGS. 2-6 merely provide examples of many different types of functional arrangements that may be employed to implement the operation of a portion of the device driver as described herein. As an alternative, the flowcharts of FIGS. 2-6 may be viewed as depicting examples of steps of methods implemented in the network host device 102 (FIG. 1) according to one or more embodiments.

Figure 2:
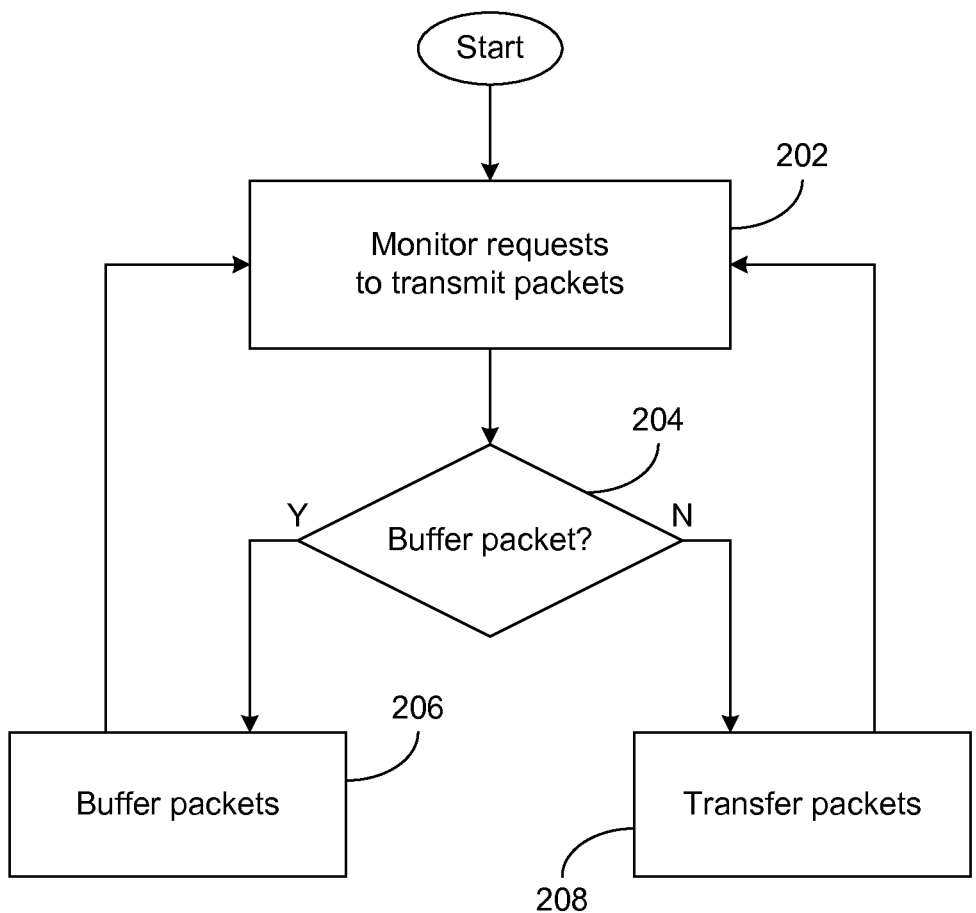
FIGS. 2-6 are flowcharts illustrating examples of functionality implemented by a device driver of the host device of FIG. 1 in accordance with various embodiments of the present disclosure.

Referring now to FIG. 2, shown is a flowchart illustrating the buffering of packets by the device driver. Initially, the device driver monitors requests to transmit packets from the host device 102 to the network through the NIC 114 (FIG. 1) via, e.g., Ethernet interface 128 in block 202. In block 204, the device driver then determines whether the packet(s) associated with a request should be transferred to the NIC 114 for transmission to the network or if the packet(s) should be buffered in the host memory 106 to delay transmission to a later time. The determination may be based upon multiple criteria such as, e.g., the operational condition of the NIC 114, the priority of the packet transmission, and/or user configurable options in an attempt to maximize power savings. For example, the device driver may estimate the power state of one or more layer(s)/component(s) of the NIC 114 to determine if packets should be buffered in block 206 based upon a power mode of the NIC 114. In some embodiments, the device driver determination may be based upon indications from the NIC 114. For example, the PHY core may provide an activity indication while operating in a low power state.

In other embodiments, communications with the NIC 114 through the PCIE interface 116 may be used to estimate the operating condition of the NIC 114. For instance, if there was a send request or a receive request that was recently communicated to the NIC 114 (e.g., within a predefined time period) then the NIC 114 may be considered to be in a full power mode. If no communication has been sent through the PCIE interface 116 (FIG. 1) within a preceding time period, then the NIC 114 may be considered to be operating in a low power mode. The operating states of the PCIE core 112b (FIG. 1) and/or the PHY core 126 (FIG. 1) may also be estimated in a similar fashion. For example, the device driver may track the idle time after packet transmission before the ASPM of the PCIE core 112b and/or the EEE of the PHY core 126 would initiate a transition to a low power state. In some implementations, the device driver may estimate that the NIC 114 to always operating in the low power mode or the PCIE core 112b and/or the PHY core 126 to always operate in a low power state. The operation of the device driver in this situation may be configured by the user of the system.

If the device driver estimates that the NIC is in a low power mode, e.g., when the PCIE core 112b and/or the PHY core 126 are operating in low power states, then packets may be buffered to extend operation of the NIC 114 in the low power mode before transitioning back to a full power mode. In this way, power savings may be improved by increasing the time that the PCIE core 112b and/or the PHY core 126 (as well as other layers or components) are operating in low power states and reducing the number of transitions between the two power states. After buffering the packet(s), the device driver returns to block 202 to continue monitoring requests to transmit packets.

On the other hand, the device driver may determine that the packet(s) should be transferred to the NIC 114 in block 208 for transmission with minimum transmission delay. For instance, if a user is more concerned about transmission latency than power savings, then the device driver may be configured to always transfer packets without buffering in the host memory 106. The device driver then returns to block 202 to continue monitoring requests to transmit packets.

In other cases, the device driver may determine that the packet(s) should be transferred to the NIC 114 for transmission in block 208 based at least in part upon the estimated or actual power state of the PCIE core 112b and/or the PHY core 126. For instance, if the PCIE core 112b is operating in a full power state when a request to transmit is detected, then the packet(s) associated with the request may be transferred to the NIC 114. By providing the packet(s) while the PCIE core 112b is operating in the full power state, the device driver minimizes transmission latency without adversely impacting the power savings. If no packets are currently being transferred but the PCIE core 112b is considered to be in a full power state, the packet(s) may be transferred to the PCIE core 112b for transmission by the PHY core 126. In some cases, the transferred packet(s) may be temporarily buffered in the NIC memory 120 before transmission.

When a "batch" transfer of buffered packets to the NIC 114 is in progress, then packet(s) corresponding to transfer requests that are received during the transfer may be added to the packets already buffered in the host memory 106 and included as part of the "batch" transfer. In some implementations, packet transfers to the NIC 114 may begin when the PCIE core 112b is considered to be operating in the full power state even if the PHY core 126 has not completed a transition to a full power state. As noted above, the packet(s) may be temporarily buffered in the NIC memory 120 before subsequent transmission by the PHY core 126. Once the transfer of buffered packets is complete, then the device driver may begin tracking the idle time before the ASPM of the PCIE core 112b and/or the EEE of the PHY core 126 initiates a transition back to a low power state. If a request to transmit a packet is received during this time, the device driver may transfer the packet(s) to the NIC 114 for transmission in which case tracking of the idle time begins again. The device driver may then reset it tracking of the idle time based upon this transfer. In alternative implementations, the device driver may buffer the packet(s) corresponding to the request and estimate that the transition to the low power state has occur. The operation of the device driver in this situation may be configured by the user of the system.

In some embodiments, the determination to buffer a packet may be based at least in part upon the priority of the packet transmission. The device driver may determine a priority level associated with the packet transmission request and transfer the packet to the NIC 114 with a minimum of delay. If the NIC 114 is estimated to be operating in a low power mode or the PCIE core 112b and/or the PHY core 126 are/is estimated to be in a low power state, the device driver may initiate transition of the NIC 114, PCIE core 112b, and/or the PHY core 126 to a full power mode or state to minimize the transmission latency. For example, latency requirements for transmission requests from a specific device may demand reduced transmission latency while transmission requests from other sources may tolerate the increased latency that may result from buffering and batch transmission. In that case, a priority level corresponding to packet(s) from the source of the request is determined and the packet(s) either transferred or buffered based at least in part upon the priority level and/or predefined priority criteria. Transition of the NIC 114, PCIE core 112b, and/or the PHY core 126 from low power operation to full power operation may be initiated based upon the priority level and/or predefined priority criteria to facilitate transmission of the packet(s). The device driver may allow the priority levels and/or priority criteria to be configured by a user.

In other implementations, the priority level (and thus buffering) may be based upon the packet type or protocol. For example, TCP/IP packets may not be buffered in order to minimize their transmission latency while other packet types or protocols may tolerate an increased latency and thus may be buffered to increase power savings. In alternative embodiments, the request for transmission may include priority level information associated with the packet such as, an IP address, TCP or UDP port numbers, packet protocols (e.g. TCP/IP or IPX), etc., which may be used by the device driver to determine whether to buffer or transfer the packet. The device driver may determine, based upon the priority level information, whether predefined priority criteria are met and then buffer or transfer the packet based at least in part upon the determination.

Figure 3:
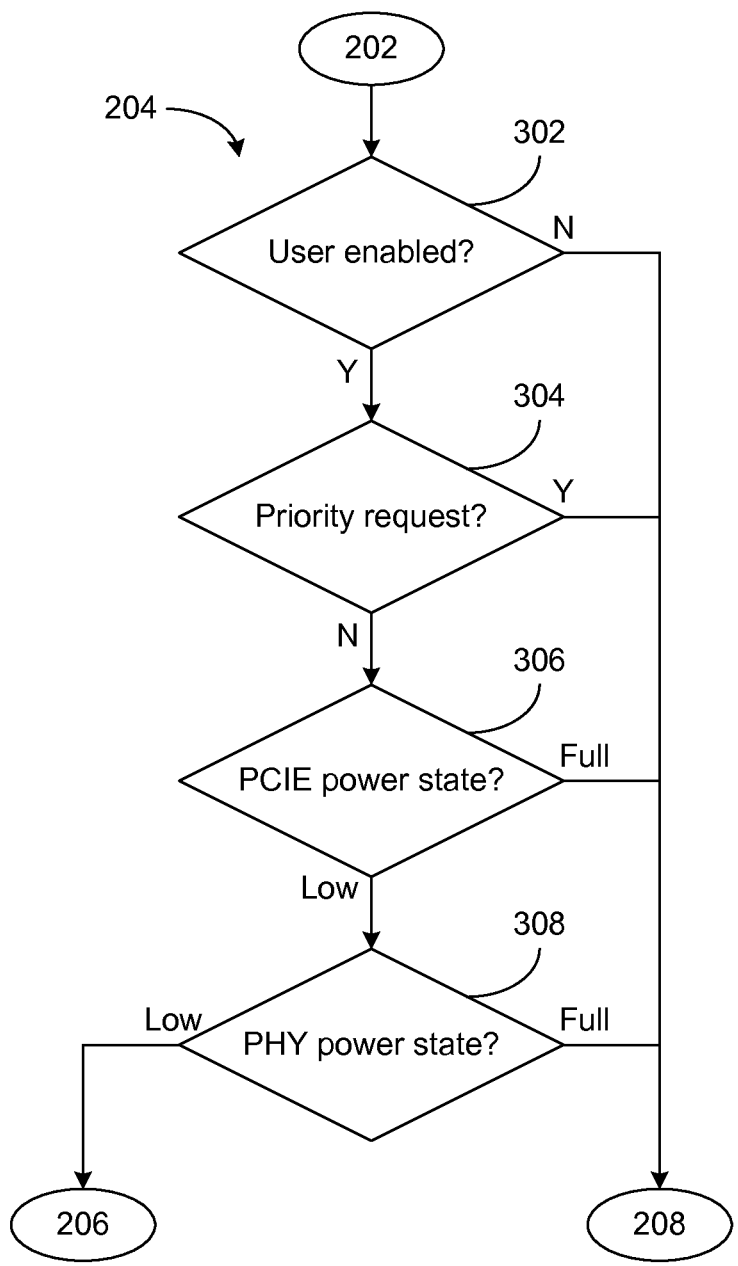

Referring to FIG. 3, shown is an example of the buffering determination of block 204 of FIG. 2. In the example of FIG. 3, when a request for transmission is detected in block 202, it is first determined in block 302 whether the user has enabled the buffering feature of the device driver. If the packet buffering feature in not enabled, then the flow proceeds to block 208 where the packet is transferred to the NIC 114 (FIG. 1) for transmission. If the buffering feature is enabled, then the flow proceeds to block 304 where the priority of the request is determined. For example, if the priority level of the packet transmission satisfies the predefined priority criteria (e.g., the packet protocol matches a predefined protocol), then the flow proceeds to block 208 where the packet is transferred to the NIC 114 to minimize the delay. If the NIC 114 is estimated to be in a low power mode, then the device driver may initiate transition of the NIC 114 to a full power mode in preparation for transmission of the packet.

In block 306, the device driver estimates the power state of the PCIE core 112b (FIG. 1). The estimation may be based upon indications provided by the NIC 114 or may be based upon recent communications such as, e.g., send and receive requests that were sent to the PCIE core 112b by the host device 102 (FIG. 1). For example, if no communication has occurred across the PCIE interface 116 (FIG. 1) for a predefined period of time, then the device driver may consider the PCIE core 112b to be operating in a low power state. If the PCIE core 112b is determined to be operating in a full power state, then the flow proceeds to block 208 where the packet is transferred to the NIC 114. If the PHY core 126 (FIG. 1) is estimated to be in a low power state while the PCIE core 112b is in the full power state, then the device driver may initiate transition of the PHY core 126 to a full power state to enable transmission of the packet to the network. If the PCIE core 112b is considered to be in a low power state in block 306 and the PHY core 126 is estimated to be in a low power state in block 308, then the packet is buffered in host memory 106 in block 206. However, if the PHY core 126 is in a full power state in block 308, then the device driver initiates transition of the PCIE core 112b to the full power state and the packet is transferred to the NIC 114 in block 208. Other criteria may also be evaluated in the buffering determination of block 204 as can be understood.

Figure 4:
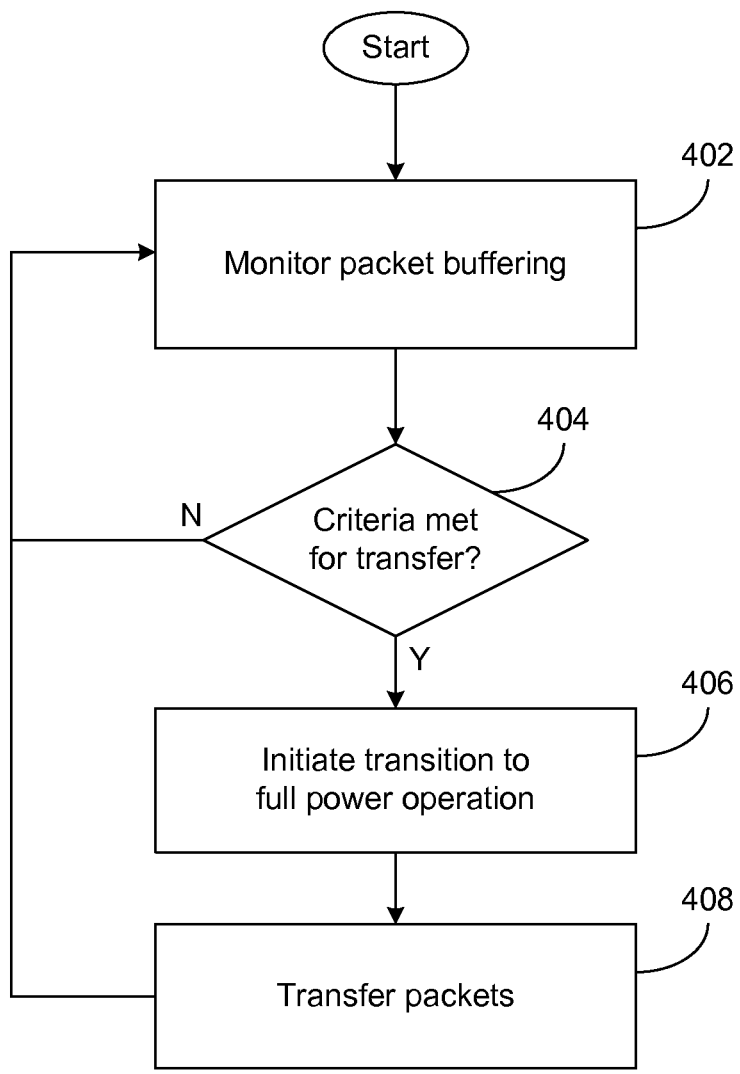

Referring now to FIG. 4, shown is a flowchart illustrating an example of the transfer of buffered packets by the device driver. Initially, the device driver monitors the packet buffering in block 402 while the NIC 114 (FIG. 1) is in a low power mode. For example, the NIC 114 may be estimated to be in a low power mode when one or both the PCIE core 112b (FIG. 1) and/or the PHY core 126 (FIG. 1) are operating in low power states. In some implementations, the device driver may be configured to estimate that the NIC 114 is always operating in a low power mode. In block 404, the device driver then determines if criteria associated with the buffered packets has been met. If no criteria associated with the buffered packets has met, then the device driver returns to monitoring packet buffering in block 402. If one or more of the predetermined criteria of block 404 are satisfied, then in block 406 the device driver initiates transition of the NIC 114 to a full power mode and/or transition of the PCIE core 112b and/or the PHY core 126 to full power states. For example, the transition may be initiated if, e.g., a predefined number of requests to transmit packets have been detected, a predefined number of packets have been buffered, a predefined time period after entering the low power state has expired, the priority level associated with a request to transmit packets satisfies a predefined priority criteria, a predefined amount of packet data has been buffered, etc. The criteria may be evaluated individually or in combination. In addition, the device driver may allow for user configuration of the criteria for transfer. Transfer of the buffered packets may be initiated in block 408 when at least the PCIE core 112b completes its transition to the full power state. The transferred packets may be temporarily buffered in the NIC memory 120 before transmission by the PHY core 128. In general, all of the buffered packets are transferred to the NIC 114 for transmission to the network in block 408 before the flow returns to monitoring packet buffering in block 402. In some implementations, packets corresponding to requests that are received during the transfer of the buffered packets are included in the "batch" transfer of block 408. In other embodiments, only a portion of the buffered packets may be transferred to the NIC 114 before returning to low power operations. The device driver may allow this to be configured by a user based upon, e.g., duration of transfer or amount of transferred data.

Figure 5:
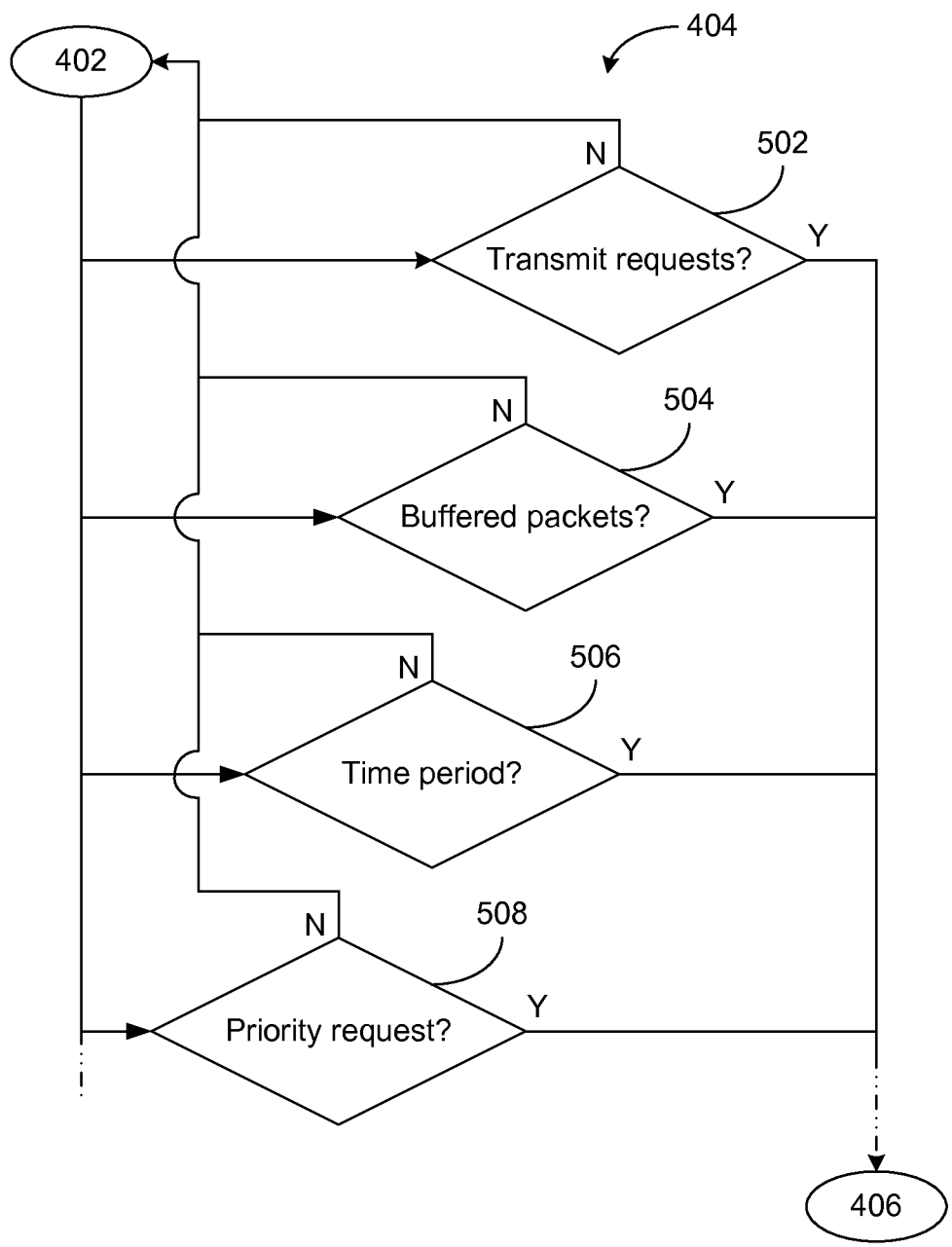

In the example of FIG. 4, the device driver loops between monitoring the packet buffering in block 402 and determining if any of the transfer criteria has been met in block 404. FIG. 5 illustrates an example of the transfer criteria determination of block 404 of FIG. 4. Various criteria may be used to determine if a transfer of the buffered packets should be initiated by the device driver. For example, in block 502 the number of requests to transmit packets may be compared to a predefined threshold. If the number of detected requests meets and/or exceeds the threshold value, then the device driver initiates transition from low power operation of the NIC 114 (FIG. 1) to full power operation in block 406 of FIG. 4. For instance, the device driver may initiate transition of the PCIE core 112b and the PHY core 126 to full power states in preparation for transmission of the buffered packets in block 408 of FIG. 4. The device driver may also initiate the transition of other layers/components of the NCI 114 that may be operating in a low power state.

Other criteria may also be evaluated in the transfer determination of block 404. For example, in block 504 the number of buffered packets may be compared to a predefined threshold. If the number of packets that have been buffered meets and/or exceeds the threshold value, then the device driver initiates transition to full power operation in block 406. In some embodiments, the amount of data in the buffered packets may be compared to a predefined threshold if, e.g., limited memory space is available for buffering.

In addition, the period of time that the NIC 114 has been operating in the low power mode may be compared to a predefined time limit or threshold in block 506 to determine if packet transmission should be initiated. The time period begins after the NIC 114 is considered to have entered the low power mode or begins low power operation, e.g., after the PCIE core 112b and/or the PHY core 126 is estimated to have entered a low power state. In some embodiments, the time period begins when both the PCIE core 112b and the PHY core 126 are considered to have entered their low power states. If the time period expires (e.g., meets or exceeds the predefined time limit), then the device driver may initiate transition to full power operation in block 406. The predefined time limit or period of time may be based, e.g., upon a user defined level of packet transmission latency that would be acceptable to the user.

In some embodiments, the device driver may check to confirm if any packets have been buffered before initiating the transition of the NIC 114. If no packets have been buffered, then there is no need to initiate a transition to full power operation at that time. In other embodiments, the time period may not begin until a first packet is buffered in the host memory 106 (FIG. 1) after the NIC 114 is considered to be operating in a low power mode. In this way, power savings may be maximized by extending the low power operation of the NIC 114 without extending the latency of the packet transmission beyond the predefined time limit. In alternative embodiments, the time period is evaluated in block 506 only after the number of number of requests to transmit packets (block 502) or the number of buffered packets (block 504) has been examined. If no requests have been received or no packets have been buffered, then a transition from low power operation is not needed. In this way, combinations of criteria may be used to determine whether to initiate a transition from low power operation to full power operation.

Additional criteria may be examined in block 404 to determine if transfer of the buffered packets should be initiated by the device driver. For example, if a priority level associated with a detected request meets a predefined priority criterion, then the device driver may initiate transition to full power operation in block 406. In some cases, the priority criterion that is used may depend upon the number of buffered packets or the number of packets of a certain type or protocol that have been buffered. Additional criteria associated with the buffered packets may also be examined to determine if the device driver should initiate transmission of the buffered packets.

Figure 6:
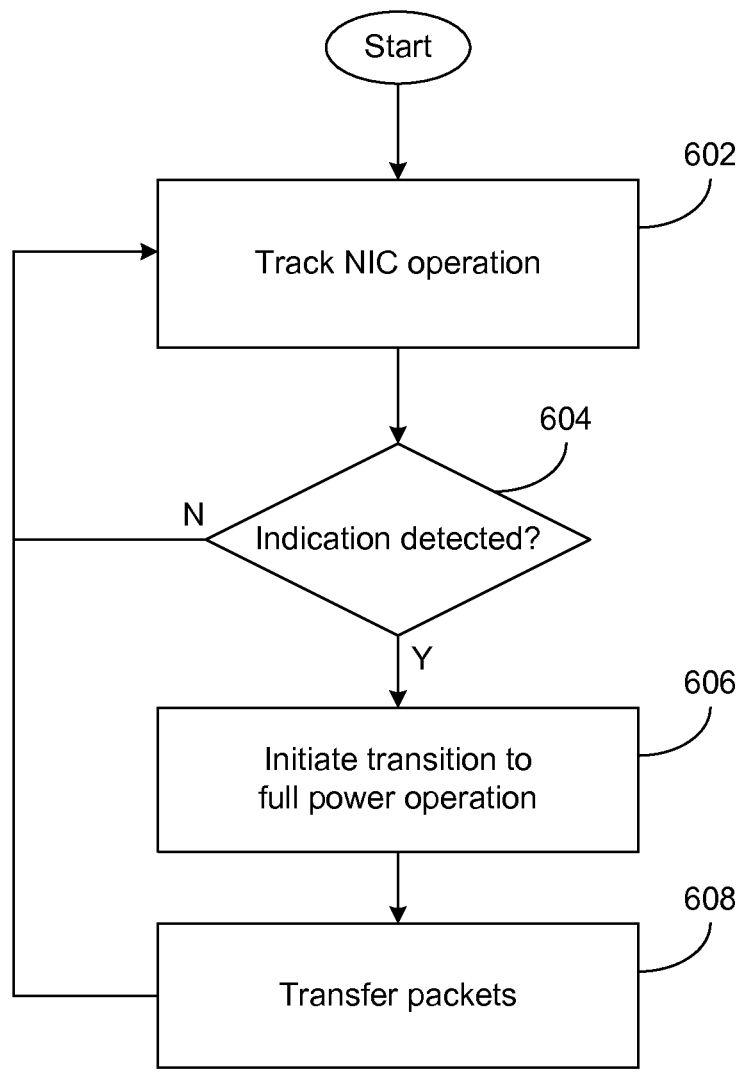

The device driver may also be configured to monitor the operation of the NIC 114 (FIG. 1) to determine if transmission of buffered packets should be initiated. Referring to FIG. 6, shown is a flowchart illustrating an example initiating the transfer of buffered packets by the device driver based upon the operation of the NIC 114. Initially, the device driver tracks the operational condition of the NIC 114 in block 602. For example, the device driver may monitor for indications of the PCIE core 112b and/or the PHY core 126 transitioning to a full power state. The device driver may also monitor the NIC 114 for other indications such as a packet being received from the network. For example, the PHY core 126 (or MAC 124) may be configured to communicate an indication to the device driver when the PHY core 126 senses that it is about to receive a packet through the Ethernet interface 128. In other implementations, the device driver may monitor for requests sent to the NIC 114 to receive a packet through the Ethernet interface 128, which may initiate a transition of the PHY core 126 to a full power state, or may detect when a layer or component of the NIC 114 enters a full power state for another reason.

If an indication is detected in block 604, then the device driver may initiate a transition the PCIE core 112*b* and the PHY core 126 to begin full power operation of the NIC 114 in block 606. The device driver may also initiate the transition of other layers/components of the NIC 114 to full power operation. If the transitions have already been initiated, then the device driver may proceed to block 608. Transfer of the buffered packets to the NIC 114 may be initiated when at least the PCIE core 112*b* enters a full power state. In some cases, the transferred packet(s) may be temporarily buffered in the NIC memory 120 before transmission to the network. By initiating the transmission of buffered packets when a portion of the NIC 114 enters a full power state, the increase in power usage can be minimized while the transmission latency can be reduced.

Although the device driver and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

Software components may be stored in the host memory 106 and are executable by the CPU 104. In this respect, the term "executable" means a program file that is in a form that can ultimately be run by the CPU 104. Examples of executable programs may be, for example, a compiled program that can be translated into machine code in a format that can be loaded into a random access portion of the host memory 106 and run by the CPU 104, source code that may be expressed in proper format such as object code that is capable of being loaded into a random access portion of the host memory 106 and executed by the CPU 104, or source code that may be interpreted by another executable program to generate instructions in a random access portion of the host memory 106 to be executed by the CPU 104, etc. An executable program may be stored in any portion or component of the host memory 106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The flowcharts of FIGS. 2-6 show the functionality and operation of an implementation of portions of the device driver. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a CPU 104 in a host device, a computer system, or other system. The machine code may be converted from the source code, etc. If embodied in hardware, each block may represent a circuit or a number of interconnected circuits to implement the specified logical function(s).

Although the flowcharts of FIGS. 2-6 show a specific order of execution, it is understood that the order of execution may differ from that which is depicted. For example, the order of execution of two or more blocks may be scrambled relative to the order shown. Also, two or more blocks shown in succession in FIGS. 2-6 may be executed concurrently or with partial concurrence. Further, in some embodiments, one or more of the blocks shown in FIGS. 2-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the device driver, that comprises software or code can be embodied in any non-transitory computer-readable medium for use by or in connection with an instruction execution system such as, for example, a CPU 104 or other processor in a host device, a computer system, or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system, comprising:
a host device including a network interface configure to transmit packets from the host device to another device via a network, the network interface being configured to transition to a low power mode transparent to an operating system on the host device; and
circuitry configured to:
monitor host device requests to transmit one or more packets from the host device to the network;
estimate, when a request is received to transmit one or more packets from the host device, whether the network interface is in the low power mode based on whether a predetermined amount of time has passed since a previous communication was transmitted from the host device to the network via the network interface and without performing any communication over an interface that directly connects a system on the host device to the network interface;
buffer the one or more packets in memory of the host device based at least partially on the host device network interface being estimated to be in a low power mode;
initiate transition of the host device network interface to a full power mode based at least in part upon predefined criteria associated with the buffered packets; and
control transmission of the buffered packets to the network to begin when the host device network interface enters the full power mode.

2. The system of claim 1, wherein the host device network interface is a network interface controller (NIC).

3. The system of claim 2, wherein the NIC is considered to be in the low power mode when a peripheral component interconnect express (PCIE) core of the NIC is estimated to be operating in low power state.

4. The system of claim 3, wherein the NIC is considered to be in the low power mode when both the PCIE core and a physical layer (PHY) core of the NIC are estimated to be operating in low power states.

5. The system of claim 3, wherein the NIC enters the full power mode when both the PCIE core and the PHY core are operating in full power states.

6. The system of claim 2, wherein the NIC is considered to be in the low power mode when a physical layer (PHY) core of the NIC is estimated to be operating in low power state.

7. The system of claim 1, wherein the transition of the host device network interface to the full power mode is initiated when a predefined number of host device requests to transmit packets have been detected after the estimated entry of the host device network interface in the low power state.

8. The system of claim 1, wherein the transition of the NIC to the full power mode is initiated when a predefined time period expires, where the predefined time period begins when the host device network interface is estimated to have entered the low power mode.

9. A system, comprising:
a host device including a network interface controller (NIC), the NIC being configured to transition to a low power mode transparent to an operating system on the host device; and
circuitry configured to:
monitor host device requests to transmit one or more packets from the host device to another device on a network through the NIC;
estimate, when a request is received to transmit one or more packets from the host device, whether the NIC is in a low power mode based on whether a predetermined amount of time has passed since a previous communication was transmitted from the host device to the network via NIC and without performing any communication over an interface that directly connects a system on the host device to the NIC;
buffer the one or more packets in memory of the host device based at least partially on the NIC being estimated to be in a low power mode;
initiate transition of the NIC to a full power mode based at least in part upon predefined criteria associated with the buffered packets; and
control the NIC to begin transmission of the buffered packets to the NIC when the NIC enters the full power mode.

10. The system of claim 8, wherein the NIC is considered to be in a low power mode when a peripheral component interconnect express (PCIE) core of the NIC is estimated to be operating in a low power state.

11. The system of claim 10, wherein the device driver initiates transfer of the buffered packets to the NIC for transmission when the PCIE core is operating in a full power state.

12. The system of claim 9, wherein the transition of the NIC to the full power mode is initiated when a predefined number of host device requests to transmit packets have been detected after the NIC entered the low power state.

13. The system of claim 9, wherein the transition of the NIC to the full power mode is initiated when a predefined time period expires, where the predefined time period begins when the NIC enters the low power mode.

14. The system of claim 9, wherein the transition of the NIC to the full power mode is initiated when a predefined time period expires, where the predefined time period begins when a first host device request to transmit packets after the NIC enters the low power mode is detected.

15. The system of claim 9, wherein the transition of the NIC to the full power mode is initiated when a priority level associated with a detected host device request meets a predefined priority criterion.

16. The system of claim 9, wherein the circuitry further includes:
logic that monitors the NIC for indications of a packet being received from the network when the NIC is in the low power mode; and
logic that initiates transition of the NIC from the low power mode to the full power mode in response to an indication that a packet is being received.

17. The system of claim 16, wherein the transition of the NIC to the full power mode is initiated if at least one packet has been buffered in the memory of the host device and is not initiated otherwise.

18. The system of claim 9, wherein the NIC is an Ethernet controller configured for Energy Efficient Ethernet (EEE) operation.

19. The system of claim 9, wherein all of the buffered packets are transmitted to the network by the NIC before initiating transition of the NIC to the low power mode.

20. A method, comprising:
estimating, when a request is received to transmit one or more packets from a host device, a power state of a peripheral component interconnect express (PCIE) core of a network interface controller (NIC) on the host device based on whether a predetermined amount of time has passed since a previous communication was transmitted from the host device to a network via the NIC, the NIC being configured to transition to a low power mode transparent to an operating system on the host device, and the estimating being performed without performing any communication over the PCIE core that directly connects a system on the host device to the NIC;

buffering, in memory external to the NIC, one or more packets for transmission to the network based at least partially on the PCIE core being estimated as operating in a low power state;

initiating transition of the PCIE core to full power state based at least in part upon predefined criteria associated with the one or more buffered packets; and initiating transfer of the one or more buffered packets to the NIC for transmission when the PCIE core reaches the full power state.

21. The method of claim 20, further comprising monitoring requests to transmit the one or more packets to the network through the NIC.

22. The method of claim 21, further comprising:
determining a priority level associated with a request to transmit a packet; and
initiating transition of the PCIE core to the full power state based at least in part upon the priority level.

23. The method of claim 22, wherein the packet associated with the request to transmit is buffered prior to initiating the transition of the PCIE core.

24. The method of claim 20, further comprising:
initiating transition of the PCIE core to the full power state in response to an indication that a physical layer (PHY) core is transitioning from the low power state to the full power state.

25. The method of claim 24, wherein the PHY core is transitioning to the full power state to receive a packet from the network.

26. The method of claim 20, wherein transition of the PCIE core to the full power state is initiated when a predefined number of packets have been buffered.

27. The method of claim 20, wherein transition of the PCIE core to the full power states is initiated when the PCIE core has operated in the low power state for a predefined period of time.

28. The method of claim 27, wherein the predefined period of time is based upon a user defined level of packet transmission latency.

* * * * *